United States Patent
Yoshida et al.

(10) Patent No.: US 9,304,506 B2
(45) Date of Patent: Apr. 5, 2016

(54) RANGE SWITCHING DEVICE

(71) Applicant: DENSO CORPORATION, Kariya, Aichi-pref. (JP)

(72) Inventors: Kazuhiro Yoshida, Tokoname (JP); Jun Yamada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 72 days.

(21) Appl. No.: 14/078,659

(22) Filed: Nov. 13, 2013

(65) Prior Publication Data

US 2014/0139171 A1   May 22, 2014

(30) Foreign Application Priority Data

Nov. 19, 2012 (JP) ................................. 2012-253330

(51) Int. Cl.
| | |
|---|---|
| *H02P 6/00* | (2006.01) |
| *G05B 19/39* | (2006.01) |
| *F16H 61/32* | (2006.01) |
| *F16H 61/28* | (2006.01) |

(52) U.S. Cl.
CPC ................ *G05B 19/39* (2013.01); *F16H 61/32* (2013.01); *F16H 2061/283* (2013.01); *F16H 2061/326* (2013.01); *G05B 2219/42095* (2013.01)

(58) Field of Classification Search
CPC .............. H02P 3/00; H02P 31/00; G05D 3/00
USPC ............ 318/400.01, 700, 701, 721, 724, 800, 318/801, 430, 432, 400.4; 388/800, 825, 388/848
See application file for complete search history.

(56) References Cited

U.S. PATENT DOCUMENTS

| | | | |
|---|---|---|---|
| 7,161,314 B2 * | 1/2007 | Nakai | H02P 6/24 318/400.4 |
| 7,609,012 B2 * | 10/2009 | Kamio et al. | 318/266 |

(Continued)

FOREIGN PATENT DOCUMENTS

| | | |
|---|---|---|
| JP | 2004-11682 | 1/2004 |
| JP | 2004-308848 | 11/2004 |
| JP | 2007-056855 | 3/2007 |

OTHER PUBLICATIONS

Office Action (1 page) dated Nov. 21, 2014, issued in corresponding Japanese Application No. 2012-253330 and English translation (2 pages).

(Continued)

*Primary Examiner* — Antony M Paul
(74) *Attorney, Agent, or Firm* — Nixon & Vanderhye P.C.

(57) ABSTRACT

A range switching device provides a feedback control for rotating a motor toward a target rotation position. When a target shift range is switched, the range switching device rotates the motor toward a target rotation position by sequentially switching power supply phases of the motor based on an encoder count value. When the motor rotates within a predetermined stop range, the feedback control ends and a power supply to the motor is stopped. However, if the motor has not rotated to the target rotation position after a predetermined time has elapsed from the stopping of the power supply to the motor, an open drive is performed, in which the power supply phase of the motor is sequentially switched by open-loop control and the motor is rotated in small and/or minute steps toward the target rotation position. In such manner, position accuracy of the shift range switching is improved.

5 Claims, 4 Drawing Sheets

(56) References Cited

U.S. PATENT DOCUMENTS

| | | | |
|---|---|---|---|
| 7,667,427 B2* | 2/2010 | Kamio et al. | 318/701 |
| 8,311,716 B2* | 11/2012 | Hoshino et al. | 701/62 |
| 2003/0222617 A1* | 12/2003 | Nakai et al. | 318/701 |
| 2004/0008002 A1* | 1/2004 | Kamio et al. | 318/701 |
| 2006/0108966 A1* | 5/2006 | Kamio et al. | 318/701 |
| 2007/0182353 A1* | 8/2007 | Kamio et al. | 318/466 |
| 2008/0024081 A1 | 1/2008 | Isobe et al. | |
| 2009/0292431 A1* | 11/2009 | Hoshino et al. | 701/62 |

OTHER PUBLICATIONS

Office Action (2 pages) dated Jul. 30, 2015, issued in corresponding Japanese Application No. 2012-253330 and English translation (2 pages).

* cited by examiner

RANGE SWITCHING DEVICE

CROSS-REFERENCE TO RELATED APPLICATION

This application is based on and claims the benefit of priority of Japanese Patent Application No. 2012-253330 filed on Nov. 19, 2012, the disclosure of which is incorporated herein by reference.

TECHNICAL FIELD

The present disclosure generally relates to a range switching device that switches a shift range with a motor.

BACKGROUND

In recent years, manual operations of apparatuses within vehicles, as well as in other devices, are increasingly being replaced by motor-driven operations that utilize electric motors. Motor-driven operations provide many benefits, such as space-savings, ease of assembly, improved controllability and the like. The replacement of an automatic transmission range switching mechanism within a vehicle is an example of such a replacement from manual operation to motor-driven operation. Such a mechanism is equipped with an encoder that is synchronized with the motor and outputs a pulse signal at every given angle of rotation of the motor. In operation, during a range switching (i.e., when a gear shift position of the automatic transmission is changed), the motor is driven to a target rotation position that corresponds to a target shift range and the automatic transmission is shifted to the target shift range.

In such a range switching device, for example, a shift range stop system may be provided to prevent the inadvertent switching of the shift range. The shift range may be limited by the engagement of a rotatable detent plate with a detent spring which is driven by the motor, as disclosed in a patent document 1 (i.e., Japanese Patent Laid-Open No. JP-A-2004-308848). In such a system, at the time of shift range switching, the power supply for the motor is stopped when the detent plate is rotated to a target shift range. That is, the power supply to the motor is stopped when the detent plate is rotated within a safe range where the shift range is unlikely to be wrongly/inadvertently moved to a different range position during the time when the power supply to the motor is stopped.

Patent document 1 provides a shift range switching device in which (i) a motor is rotated to a target rotation position according to a feedback control (F/B) control that drives the motor by sequentially switching power supply phases of the motor based on an encoder count value, and (ii) a power supply for the motor is stopped by ending the F/B control when the motor rotates within a predetermined stop range.

However, in such a system, even when the F/B control ends and the power supply to the motor stops, the motor may still rotate to a target rotation position if the motor has already been rotated within an attractive force range of the detent mechanism or if inertia causes the motor to rotate within such range. Rotation within an attractive force range may cause rotation to the target rotation due to a latch within the detent mechanism that is biased to slide downwardly into and engage a bottom of a range detention concave part (i.e., a concave detent). That is, even after stopping the power supply to the motor, the motor may rotate to the target rotation position due to the downward sliding of the latch into a bottom of the range detention concave part.

However, when the attractive force range of the detent mechanism is narrow relative to a stop range of the motor, depending on the shape of the detent mechanism, the motor may be unable to rotate within the attractive force range of the detent mechanism at the time the F/B control ends, which also stops the power supply to the motor. That is, in such a case, the motor may be unable to rotate to the target rotation position. A solution to such a situation may be to narrow the stop range of the motor according to the attractive force range of the detent mechanism. However, such a narrowing of the stop range of the motor may cause an overshoot of the motor. That is, if the stop range of the motor is narrowed, the rotation position of the motor may be close to the target rotation position when ending the F/B control (i.e., when the power supply for the motor is stopped), thereby making the motor susceptible to over-rotation past the target rotation position.

SUMMARY

It is an object of the present disclosure to provide a range switching device having improved rotation position accuracy when switching a shift range.

In an aspect of the present disclosure, the range switching device has a range switching mechanism having a plurality of range detention concave parts, a motor driving the range switching mechanism to switch a shift range between a plurality of shift ranges, a detent mechanism having a latch that selectively engages one of the plurality of range detention concave parts to hold the range switching mechanism at one of the plurality of shift ranges, and an encoder sensing a rotation of the motor and outputting a pulse signal in synchronization with the rotation of the motor. The range switching device also has a control unit that (i) controls the motor according to a feedback control, to rotate the motor toward a target rotation position that corresponds to a target shift range, by switching power supply phases of the motor based on a count value of the outputted pulse signal of the encoder when the target shift range is selected, and (ii) ends the feedback control of the motor to stop a power supply to the motor when a rotation position of the motor enters a stop range that includes the target rotation position. Further, the control unit controls the motor according to an open-loop control to rotate the motor to the target rotation position by sequentially switching the power supply phases of the motor when the motor has not rotated for a predetermined time after the end of the feedback control of the motor, and the open-loop control by the control unit continues until the rotation position of the motor reaches the target rotation position.

As mentioned above, when the attractive force range of the detent mechanism is narrower relative to the stop range of the motor, the motor may be unable to rotate within the attractive force range of the detent mechanism at a time when the F/B control ends and the power supply to the motor is stopped.

That is, in such a case, the motor may be prevented from rotating to the target rotation position. In the present disclosure, the motor is rotated by the open-loop control by sequentially switching the power supply phases of the motor when the motor has not been rotated after a predetermined time has elapsed from the ending of the F/B control (i.e., a stopping of the power supply to the motor). Therefore, the motor may rotate to the target rotation position even when the attractive force range of the detent mechanism is narrow. Further, the stop range of the motor need not be narrowed in accordance with the attractive force range of the detent mechanism, thereby preventing an overshoot of the rotation position of the motor (i.e., rotation of the motor past the target rotation position). In such a manner, the position accuracy of the shift range switching (i.e., the rotation position accuracy of the motor) is improved.

BRIEF DESCRIPTION OF THE DRAWINGS

Other objects, features and advantages of the present disclosure are more apparent from the following detailed description disposed with reference to the accompanying figures, in which.

DETAILED DESCRIPTION

An embodiment of the present disclosure is described in the following. First, a configuration of a range switching mechanism 11 is explained based on FIGS. 1 and 2.

Figure 1:
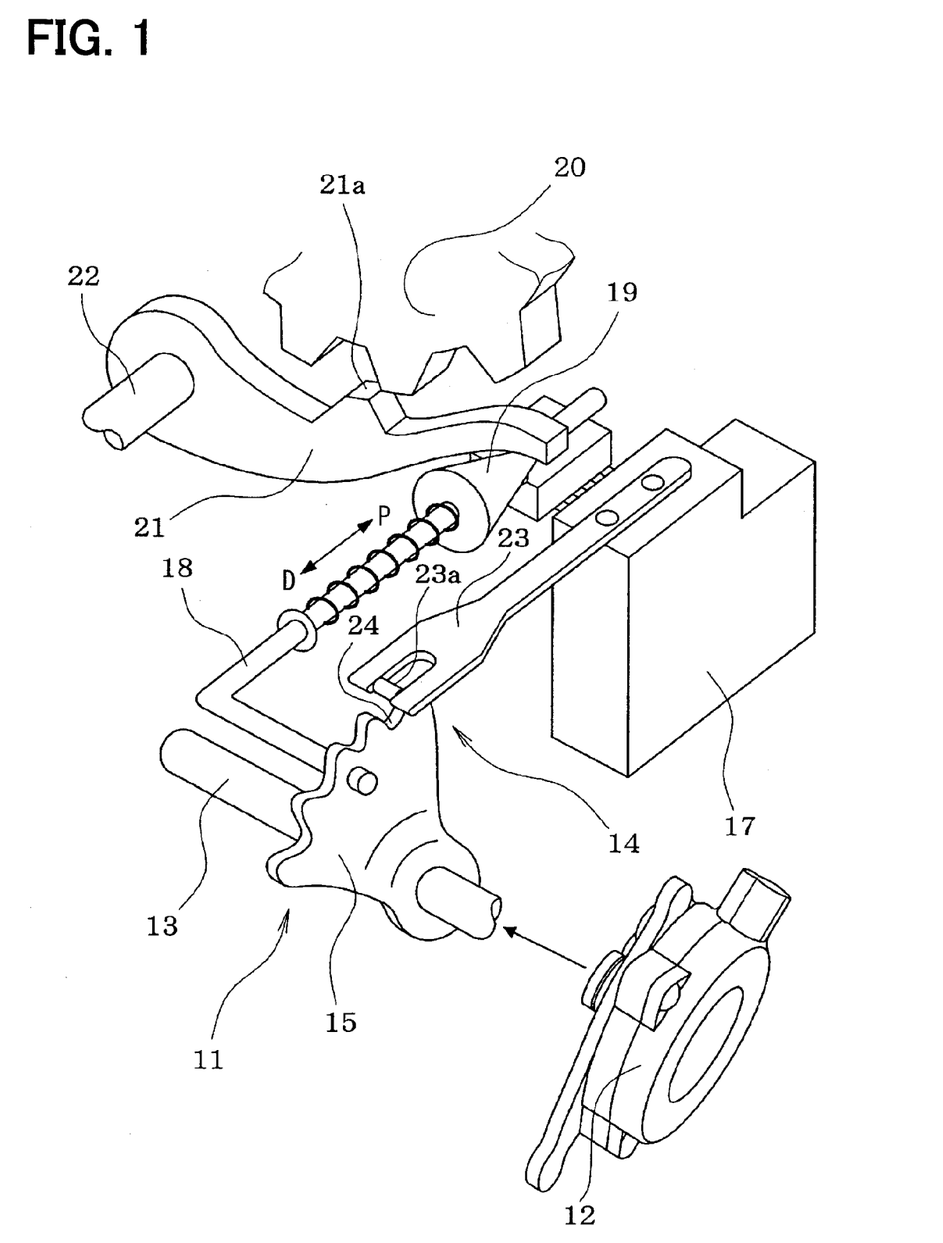
FIG. 1 is a perspective view of a range switching device in one embodiment of the present disclosure.
Figure 2:
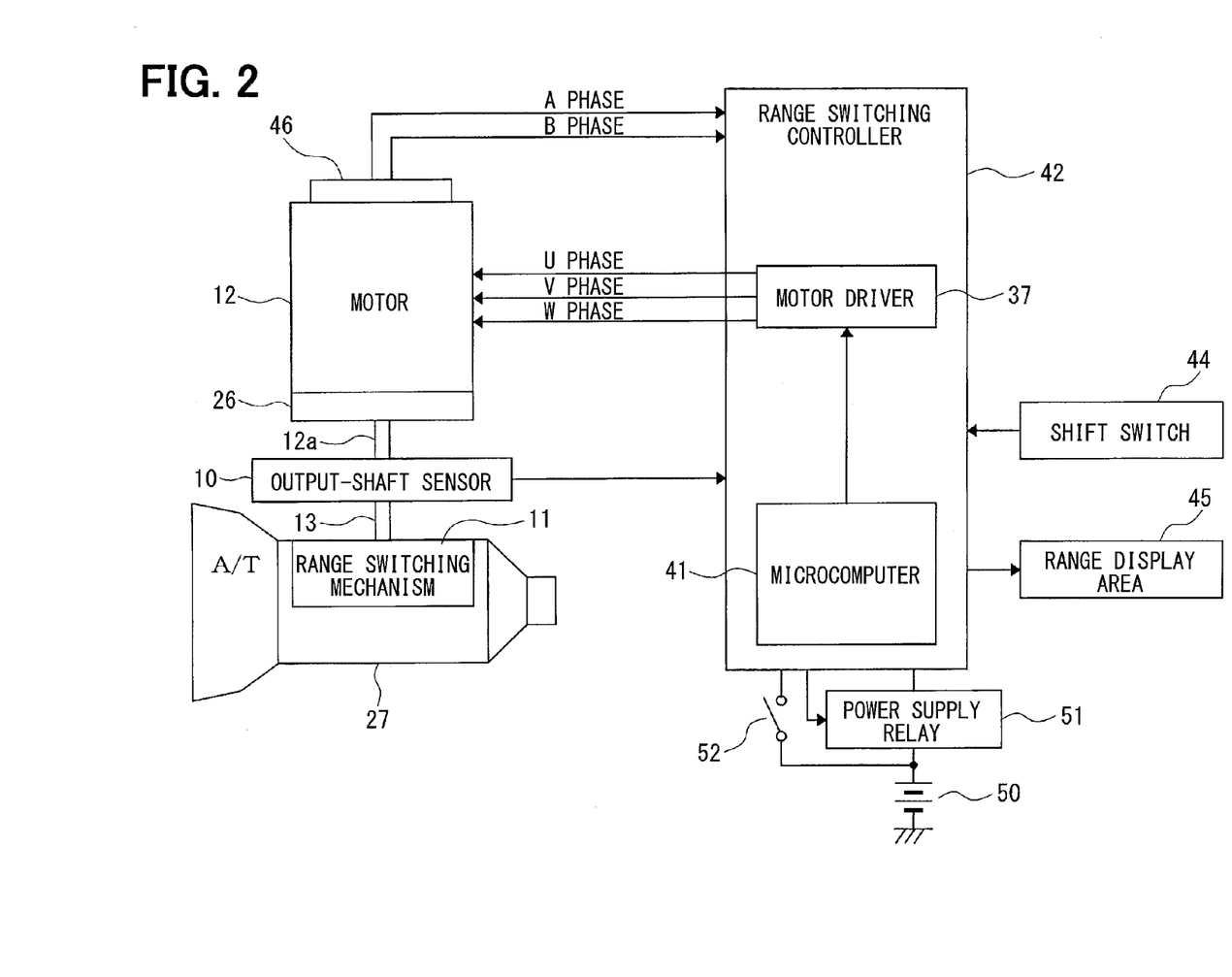
FIG. 2 is a block diagram of a control system of the range switching device.

As shown in FIG. 1, the range switching mechanism 11 is a 4-position type range switching mechanism for switching the shift range of an automatic transmission 27 (see FIG. 2) among four positions, which may include a P range (i.e., a parking range), an R range (i.e., a reverse range), an N range (i.e., a neutral range), and a D range (i.e., a drive range). The motor 12 may be a switched-reluctance motor, for example, which may be used to drive the range switching mechanism 11. As shown in FIG. 2, the motor 12 has a built-in deceleration mechanism 26. The motor 12 is also attached to an output-shaft sensor 10 for detecting a rotation position of an output shaft 12a. The output shaft 12a of the motor 12 is connected to a manual shaft 13 and a detent lever 15 is attached to the manual shaft 13.

The detent lever 15 is connected to a manual valve (not illustrated) which performs a linear motion according to a rotation of the detent lever 15. Such a manual valve is used to switch to an internal hydraulic circuit (not shown) within an inside of the automatic transmission 27.

A parking rod 18 is formed in an L-shape and fixed onto the detent lever 15. A cone body 19 is provided at a tip part of the parking rod 18 and in contact with a locking lever 21. According to the position of the cone body 19, the locking lever 21 moves (i.e., rotates) up and down centering on the shaft 22 to lock and unlock a parking gear 20. The parking gear 20 is disposed on the output axis of the automatic transmission 27, and, when the parking gear 20 is locked by the locking lever 21, the driving wheels of the vehicle are held in a locked state (i.e., a parking state) in which the wheels are prevented from rotating.

A detent spring 23 is fixed on a support base 17 and holds the detent lever 15 in each of the P, R, N, and D ranges. The detent lever 15 has a range detention concave part 24 (see FIG. 1) for each of the P, R, N, and D range, and, when an engagement part 23a provided at the tip of the detent spring 23 is engaged with one of the range detention concave parts 24, the detent lever 15 is held in the position of each of those ranges. In combination, the detent lever 15 and the detent spring 23 serve as the detent mechanism 14 (i.e., a detent) to engaging and hold the rotation position of the detent lever 15 within one of the four ranges (i.e., a device for holding the range switching mechanism 11 at one of the plural range positions).

In the P range, the parking rod 18 moves closer to the locking lever 21 such that a thick portion of the cone body 19 pushes the locking lever 21 upward. In turn, a convex part 21a of the locking lever 21 engages the parking gear 20 to lock the parking gear 20 and hold the output shaft (i.e., driving wheels) of the automatic transmission 27 in a locked state (i.e., a parking state of the vehicle).

In the R, N, and D ranges, the parking rod 18 moves away from the locking lever 21 such that the thick portion of the cone body 19 is pulled out from below the locking lever 21. In turn, the lever 21 moves downward and the convex part 21a of the locking lever 21 moves away from the parking gear 20 to release the lock of the locking lever 21. As a result, the output shaft of the automatic transmission 27 is rotatable state (i.e., a travelable state of the vehicle).

Further, the output-shaft sensor 10 mentioned above includes a rotation sensor (e.g., a potentiometer) which outputs a voltage according to the rotation angle of the output shaft 12a of the deceleration mechanism 26 of the motor 12. In addition, which of the P, R, N and D ranges for shifting into is confirmed based on the output voltage. Further, if no output-shaft sensor 10 is provided, an encoder 46 confirms which one of the P, R, N and D ranges is the actual shift range.

As shown in FIG. 2, the encoder 46 is provided in the motor 12 to detect the rotation angle (i.e., a rotation position) of a rotor. The encoder 46 is implemented as a magnetic type rotary encoder, for example, and is configured to output a pulse signal of an A phase and a pulse signal of a B phase that is in synchronization with the rotation of the rotor of the motor 12. The encoder 46 outputs the pulse signal to a range switching controller 42 at every predetermined angle. The microcomputer 41 of the range switching controller 42 counts both a rising edge and a falling edge of the A phase signal and the B phase signal, which are then outputted from the encoder 46. The motor 12 is rotated based on the switching of the power supply phases of the motor 12 in a given order by a motor driver 37 according to the count value (hereinafter encoder count value). Further, two systems (i.e., two combinations) of three-phase (U, V, W phase) windings of the motor 12 and the motor driver 37 may be provided for the contingency operation of the motor 12. That is, operation of the motor 12 may continue through the use of one functioning system even despite the malfunctioning of the other of the two systems.

During the rotation of the motor 12, a rotation direction of the motor 12 is determined based on an order of generating the A phase signal and the B phase signal. The encoder count value is counted upward when the rotation direction is determined as a positive rotation (i.e., a rotation direction from the P range toward the D range), and the encoder count value is counted downward when the rotation direction is determined as a reverse rotation (i.e., a rotation direction from the D range toward the P range). Since the correspondence between the encoder count value and the rotation angle of the motor 12 is maintained in both of the two rotation directions of the motor 12, the rotation of the motor 12 in both of the two rotation directions is controllable by the power supply for the winding in a corresponding phase that corresponds to the rotation position of the motor 12 based on the rotation position detected by the encoder count value.

A signal of a shift lever operation position detected by the shift switch 44 is input to the range switching controller 42. According to such input, that is, according to the driver's operation of the shift lever, the microcomputer 41 (i.e., a control unit) of the range switching controller 42 switches a target shift range, and drives the motor 12 according to the target shift range to switch the shift range. After the switching of the shift ranges, the controller 42 displays the actual shift range on a range display area 45 that is disposed on an instrument panel (not shown).

A power supply voltage is supplied for the range switching controller 42 via a power supply relay 51 from a battery 50 (i.e., a power supply) in the vehicle. The ON and OFF of the power supply relay 51 are switched by manually operating/switching an IG switch 52 ON and OFF (i.e., an ignition switch) which is an electric power switch. When the IG switch 52 is turned ON, the power supply relay 51 is turned ON and the power supply voltage is supplied for the range switching controller 42. When the IG switch 52 is turned OFF, the power supply relay 51 is turned OFF and the power supply for the range switching controller 42 is interrupted (i.e., is turned OFF).

In this case, since the encoder count value is memorized in RAM (not illustrated) of the microcomputer 41, when the power supply of the range switching controller 42 is turned OFF, a memory of the encoder count value is lost. Therefore, the encoder count value immediately after the turning ON of the range switching controller 42 may not correspond to the actual rotation position (i.e., the power supply phase) of the motor 12. Thus, in order to switch the power supply phases according to the encoder count value, it is necessary for the encoder count value to correspond to the actual rotation position of the motor 12 after the turning ON of the power supply, for the correspondence between the encoder count value and the power supply phase.

Therefore, the microcomputer 41 performs a learning process in which a correspondence between the power supply phase of the motor 12 and the encoder count value is learned, in an initial drive after the turning ON of the power supply. In such an initial drive, the switching of the power supply phases of the motor 12 is performed for one rotation by the open-loop control at a scheduled timing, so that the correspondence between the rotation position of the motor 12 and the power supply phase of the motor 12 is matched in one of the power supply phases, for the driving of the motor 12 and for counting the edges of the A phase signals and the B phase signals of the encoder 46. In such manner, by the time of ending the initial drive, the correspondence between (i) the encoder count value, (ii) the rotation position of the motor 12 and (iii) the power supply phase is learned.

Further, since the microcomputer 41 can only detect an amount of rotation (i.e., a rotation angle) from a start position of the motor 12 based on the encoder count value after starting of the motor 12, an absolute rotation position must be detected by after the turning ON of the motor 12, in order to accurately rotate the motor 12 to the target rotation position.

Therefore, the microcomputer 41 performs an abutment control after ending the initial drive. More specifically, the microcomputer 41 performs a "P range wall abutment control" in which the motor 12 is rotated until the engagement part 23a of the detent spring 23 abuts against a P range wall (i.e., a side wall of the P range detention concave part 24), which is a limit position on the P range side of the movable range of the range switching mechanism 11. The encoder count value of such position is then learned and used as a reference position for the control of the amount of rotation (i.e., a rotation angle) of the motor 12. Further, the reference value for the motor control may also be learned by performing a "D range wall abutment control" in which the motor 12 is rotated until the engagement part 23a of the detent spring 23 abuts against a D range wall (i.e., a side wall of a D range detention concave part 24), which is a limit position on the D range side of the movable range of the range switching mechanism 11, for the learning of the encoder count value at the D range side limit position as the reference position. Further, after the abutment control, a reverse control is performed for rotating the motor 12 in reverse by a predetermined rotation amount such that the motor 12 has a rotation position at a no warp position where the detent spring 23 is free from warping. In other words, the motor 12 is at a rotation position that subjects the spring 23 to a lesser amount of compression such that the spring 23 is unlikely to warp.

After learning the reference position, by controlling the microcomputer 41 to perform a range switching control routine illustrated in FIG. 4, which is described later, the target rotation position is changed according to the driver's shift lever operation to select one of the P, R, N or D range (i.e., when the target shift range is switched to one of the P, R, N, or D range) in the present embodiment. As such, the motor 12 is driven to the rotation position after selecting the target rotation position, for the changing of the shift range (i.e., for switching the position of the range switching mechanism 11 to the target shift range).

Figure 3:
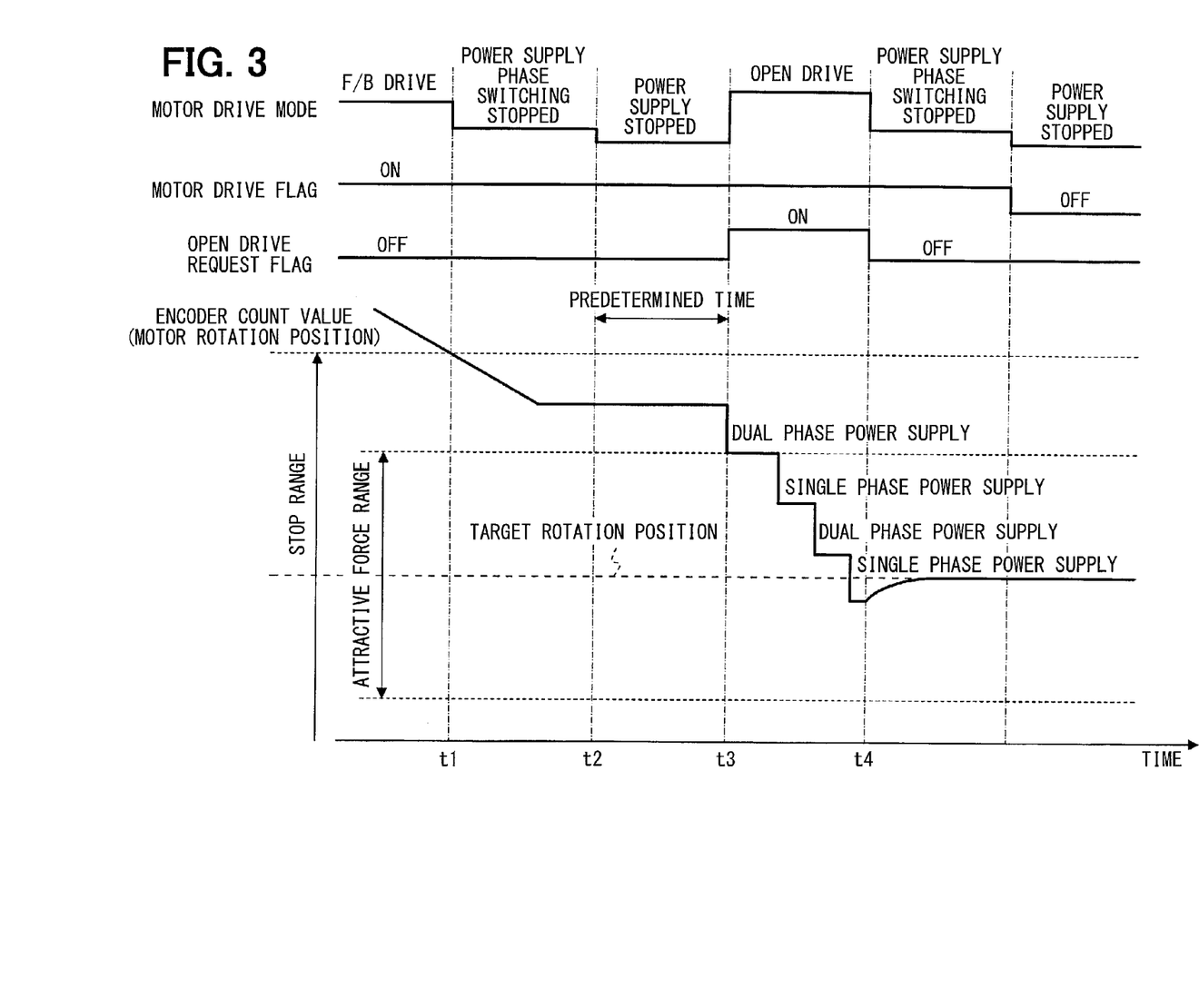
FIG. 3 is a time chart in an example of a range switching control.

As shown in FIG. 3, when a target shift range is switched, a feedback control (i.e., a "F/B control") which rotates the motor 12 toward the target rotation position (i.e., a target count value) corresponding to the target shift range, is performed by sequentially switching the power supply phase of the motor 12 based on the encoder count value. In such case, the target rotation position corresponds to a target shift range and also corresponds to an attractive force range of the detent mechanism 14, in which the engagement part 23a of the detent mechanism 14 slides downward into the range detention concave part 24, despite the motor 12 being in a power supply stop state (i.e., even when the motor 12 is not receiving a power supply).

The power supply for the motor 12 is stopped after ending the F/B control to stop the switching of the power supply phases of the motor 12 at time t1 when the motor 12 is rotated to a predetermined stop range by the F/B control. In such case, the stop range of the motor 12 is set as a specific position range which is required to prevent an overshooting of the motor 12, in which the rotation position of the motor 12 passes the target rotation position (e.g., such a range may be set as a target rotation position ±9 count).

Therefore, when the F/B control ends and the power supply for the motor 12 is stopped, if the motor 12 has already been rotated within the attractive force range of the detent mechanism 14, or if the motor 12 is rotated to within such range due to inertia, in which the engagement part 23a of the detent mechanism 14 is biased to slide downwardly into and engage a bottom of the range detention concave part 24, the motor 12 may rotate to the target rotation position even after the stopping of the power supply for the motor 12.

However, when the attractive force range of the detent mechanism 14 is narrow relative to the stop range of the motor 12, the motor 12 cannot rotate to the attractive force range of the detent mechanism 14 when the F/B control ends and the power supply for the motor 12 is stopped such that the rotation position of the motor 12 may stop short of reaching the target rotation position. However, if the stop range of the motor 12 is narrowed so that the motor 12 may rotate to the attractive force range of the detent mechanism 14, the motor 12 may become more prone to overshoot the target rotation position. That is, the rotation position of the motor 12 may easily pass the target rotation position, because the stop position of the motor 12 at the time of (i) ending the F/B control and (ii) stopping the power supply for the motor 12 is closer to the target rotation position when the stop range of the motor 12 is narrowed according to the attractive force range of the detent mechanism 14.

Therefore, if the motor 12 has not rotated to the target rotation position after a predetermined time (e.g., a sufficient amount of time for the motor 12 to rotate from a power supply stopped position to the target rotation position) has elapsed after time t2 (i.e., the time of ending the F/B control and stopping the power supply for the motor 12), the open-loop control for rotating the motor 12 performs the open drive which sequentially switches the power supply phases of the motor 12 by the open-loop control for rotating the motor 12 at time t3 (i.e., after the predetermined time from time t2). In such open drive, the power supply is alternately switched between the first phase and the second phase for rotating the motor 12 in small and/or minute steps, for example.

Then, each time the power supply phase of the motor 12 is switched by the open drive, it is determined whether the motor 12 has rotated to the target rotation position. If it is determined that the motor 12 has rotated to the target rotation position at time t4, the power supply for the motor 12 is stopped after ending the open drive and thus, stopping the switching of the power supply phase of the motor 12.

Figure 4:
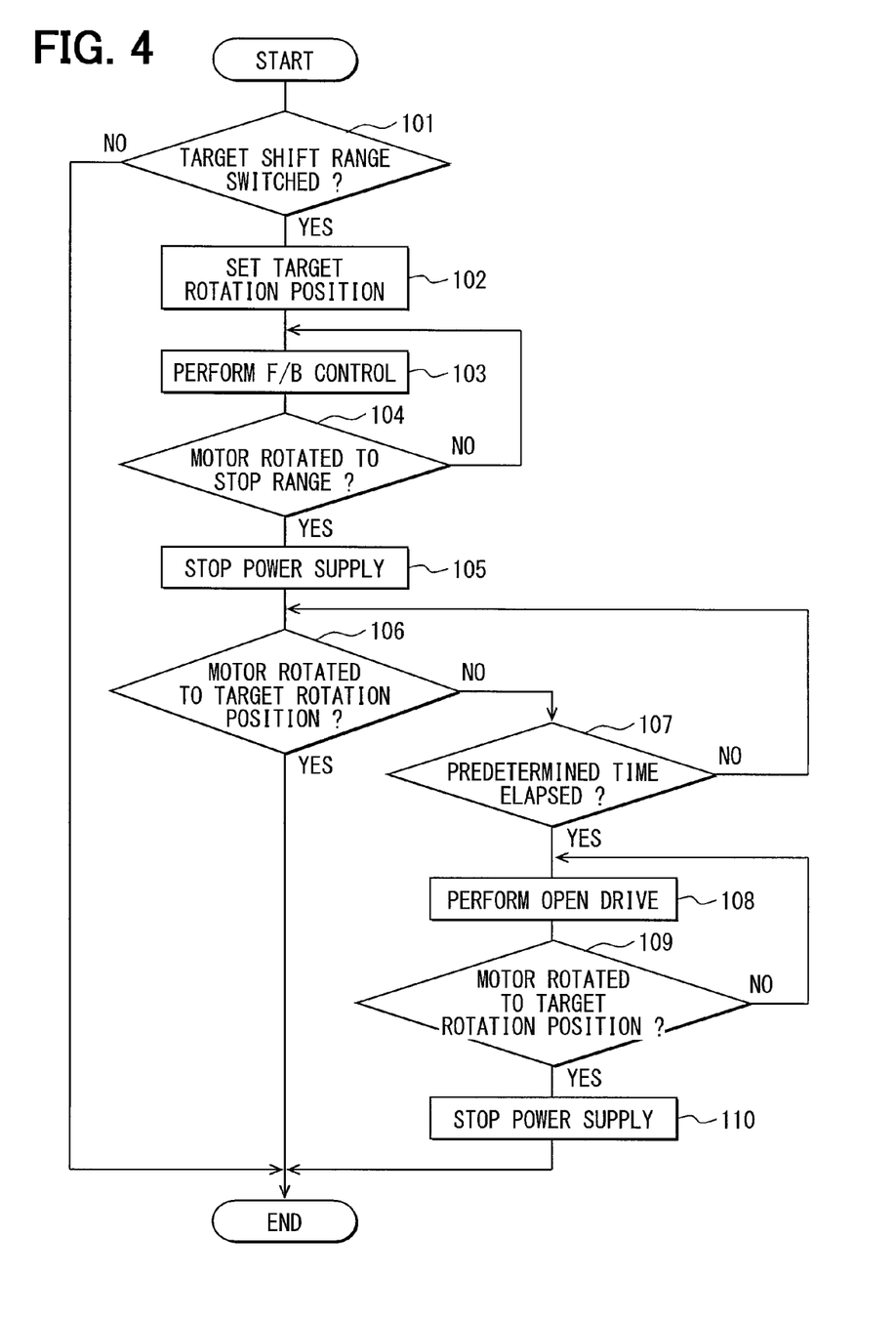
FIG. 4 is a flowchart of a process of a range switching control routine.

The range switching control of the present embodiment, as described above, is performed according to the range switching control routine of FIG. 4 by the microcomputer 41 of the range switching controller 42. Hereafter, the contents of the processing of the routine are explained.

The range switching control routine shown in FIG. 4, which is repeatedly executed at predetermined intervals during the power supply turn-ON time of the range switching controller 42, serves as a control unit in the claims. At Step 101, the routine is started and it is determined whether the target shift range has been switched to one of the P, R, N or D range. When it is determined that the target shift range has not been switched, the routine ends without performing the following steps.

On the other hand, if it is determined at Step 101 that the target shift range has been switched, the process sets the target rotation position corresponding to the after-switching target shift range at Step 102. At Step 103, the F/B control is performed, which rotates the motor 12 toward the target rotation position by sequentially switching the power supply phase of the motor 12 based on the encoder count value.

At Step 104, it is determined whether the motor 12 has rotated into the stop range by the F/B control. That is, the above determination is performed based on whether the encoder count value indicates that the rotation position of the motor 12 is in the stop range. In this Step 104, if it is determined that the motor 12 has not rotated within the stop range, the process returns to the above-mentioned Step 103, and the F/B control is continued.

If it is determined in the above-mentioned Step 104 that the motor 12 has rotated within the stop range, the power supply for the motor 12 is stopped by ending the F/B control and stopping the switching of the power supply phases of the motor 12 at Step 105.

At Step 106, it is determined whether the motor 12 has rotated to the target rotation position based on determining whether the encoder count value has passed the target rotation position. If determined in this Step 106 that the motor 12 has not rotated to the target rotation position, it is determined at Step 107 whether a predetermined time (e.g., a sufficient time for the motor 12 to rotate from a power supply stopped position to the target rotation position) has elapsed after stopping the power supply for the motor 12.

If it is determined that the predetermined time has not elapsed at Step 107 after stopping the power supply for the motor 12, the process returns to the above-mentioned Step 106, for a repeated determination of whether the motor 12 has rotated to the target rotation position.

Then, in the above-mentioned Step 106, when it is determined that the motor 12 has rotated to the target rotation position (i.e., when the motor 12 has rotated to the target rotation position in a predetermined time after stopping the power supply for the motor 12), the process ends based on the determination that the switching of the shift range is complete.

On the other hand, when it is determined that a predetermined time has passed at the above-mentioned Step 107 after stopping the power supply for the motor 12, the process proceeds to Step 108 and the open drive is performed. That is, when it is determined that the motor 12 has not rotated to the target rotation position even after an elapse of the predetermined time from the stopping of the power supply for the motor 12, the process proceeds to Step 108 and the open drive is performed, in which the power supply phases of the motor 12 are switched by the open-loop control and the motor 12 is rotated in small and/or minute steps.

At Step 109, each time the power supply phase of the motor 12 is switched by the open drive, it is determined whether the motor 12 has rotated to the target rotation position, based on a determination whether the encoder count value has passed the target rotation position. At this Step 109, if it is determined that the motor 12 has not rotated to the target rotation position, the process returns to the above-mentioned Step 108, and the open drive is continued.

When it is determined that the motor 12 has rotated to the target rotation position in the above-mentioned Step 109, it is determined that the switching of the shift range is complete. At Step 110, after ending the open drive and stopping the switching of the power supply phase of the motor 12, the power supply for the motor 12 is stopped and the present routine ends.

SUMMARY OF THE EMBODIMENT

In the present embodiment described above, when a target shift range is switched, the F/B control is performed, which rotates the motor 12 toward a target rotation position by sequentially switching the power supply phases of the motor 12 based on the encoder count value. When the motor 12 rotates within a predetermined stop range by such F/B control, the F/B control is ended and the power supply for the motor 12 is stopped. However, when the motor 12 has not rotated to the target rotation position even after an elapse of the predetermined time from the ending of the F/B control and the stopping of the power supply for the motor 12, the open drive is performed, in which the power supply phase of the motor 12 is sequentially switched by the open-loop control and the motor 12 is rotated in small and/or minute steps to the target rotation position. Therefore, even when the attractive force range of the detent mechanism 14 is narrow, the motor 12 is rotated to the target rotation position. Further, since it is not necessary to narrow the stop range of the motor 12 according to the attractive force range of the detent mechanism 14, an overshoot of the rotation position of the motor 12 (i.e., passing of the target rotation position) is prevented. In such manner, the position accuracy at the time of switching a shift range (i.e., a rotation position accuracy of the motor 12) is improved.

Further, in the present embodiment, each time the power supply phase of the motor 12 is switched by the open drive, it is determined whether the motor 12 has rotated to the target rotation position, and, when it is determined that the motor 12 has rotated to the target rotation position, the open drive is completed and the power supply for the motor 12 is stopped. Therefore, the motor 12 is securely rotated to the target rotation position by the open drive and the motor 12 is securely stopped at the target rotation position.

Changes/Modifications

Although the present disclosure has been fully described in connection with the above embodiment thereof with reference to the accompanying drawings, it is to be noted that various changes and modifications is apparent to those skilled in the art.

For example, when the target shift range is switched to any one of plural ranges, the present disclosure is used in the above embodiment. However, the present disclosure is not limited to such a scheme. That is, the present disclosure may be used only when the target shift range is switched to a specific range. For example, when the system has a narrow attractive force range for the P range, the present disclosure may be used only when the target shift range is switched to the P range (i.e., only when switching a shift range to the P range). Similarly, when the system has a narrow attractive force range for the D range, the present disclosure may be used only when the target shift range is switched to the D range (i.e., only when switching a shift range to the D range).

In the above-mentioned embodiment, the encoder 46 may be a magnetic type encoder. However, other types of encoders such as an optical-type encoder or a brush-type encoder may also be used as the encoder 46, for example. Further, the encoder 46 is not necessarily limited to a signal encoder that outputs A phase signals and B phase signals. That is, the encoder 46 may be a signal encoder that also outputs a Z phase signal, which is used for correction, in addition to the A phase signal and the B phase signal.

Further, in the above-mentioned embodiment, the motor 12 may be a switched reluctance motor (i.e., an SR motor). However, as long as the motor is a brushless type synchronous motor which detects the rotation position of the motor based on the count value of the encoder output and sequentially switches the power supply phase of the motor, other types of brushless type synchronous motors may also be used.

Further, in the above-mentioned embodiment, the present disclosure is applied to a system that has a range switching mechanism which switches a shift range between four ranges (i.e., among the P, R, N, and D ranges). However, the present disclosure may also be applied to a system that has a range switching mechanism other than the above. That is, for example, the present disclosure may be applicable to a system which switches a shift range between two ranges, i.e., between a P range and a non-P range. The present disclosure may further be applicable to a system of three ranges, or to a system of five or more ranges.

Further, the present disclosure is not necessarily limited to the automatic transmission (AT, CVT, DCT, etc.). That is, various changes and modifications may be included within the scope of the present disclosure. In other words, the range switching device for switching the shift range of the speed reducer of an electric vehicle or the like may also be included in the scope of the invention.

Such changes and modifications are to be understood as being within the scope of the present disclosure as defined by the appended claims.

What is claimed is:

1. A range switching device comprising:
   a range switching mechanism having a plurality of range detention concave parts;
   a motor driving the range switching mechanism to switch a shift range between a plurality of shift ranges;
   a detent mechanism having a latch that selectively engages one of the plurality of range detention concave parts to hold the range switching mechanism at one of the plurality of shift ranges;
   an encoder sensing a rotation of the motor and outputting a pulse signal in synchronization with the rotation of the motor; and
   a control unit that (i) controls the motor according to a feedback control, when a target shift range is selected, to rotate the motor toward a target rotation position that corresponds to the target shift range, by switching power supply phases of the motor based on a count value of the outputted pulse signal of the encoder, and (ii) ends the feedback control of the motor to stop a power supply to the motor when a rotation position of the motor enters a stop range that includes the target rotation position, wherein
   the control unit controls the motor according to an open-loop control to rotate the motor to the target rotation position by sequentially switching the power supply phases of the motor when the motor has not rotated for a predetermined time after the end of the feedback control of the motor, and
   the open-loop control by the control unit continues until the rotation position of the motor reaches the target rotation position.

2. The range switching device of claim 1, wherein
   the control unit determines whether the motor has rotated to the target rotation position when the switching of the power supply phases of the motor is performed by the open-loop control, and
   the control unit ends the open-loop control to stop the power supply to the motor when the control unit determines that the motor has rotated to the target rotation position.

3. A method for switching a shift range between one of a plurality of shift ranges, the method comprising:
   rotating a motor according to a feedback control, when a target shift range is selected, to rotate the motor toward a target rotation position that corresponds to the target shift range, by switching power supply phases of the motor based on a count value of an output signal of an encoder in synchronization with the rotation of the motor;
   stopping a power supply to the motor when a rotation position of the motor enters a stop range that includes the target rotation position; and
   rotating the motor according to an open-loop control, until the rotation position of the motor reaches the target rotation position, by sequentially switching the power supply phases of the motor, when the motor has not rotated for a predetermined time after stopping the power supply to the motor.

4. The method of claim 3, wherein the rotating of the motor is performed according to the open-loop control, until the rotation position of the motor reaches the target rotation position, by sequentially switching the power supply phases of the motor, when the motor has not rotated for the predetermined time after the end of the feedback control of the motor and after stopping the power supply to the motor.

5. The method of claim 4, further comprising
   determining whether the motor has rotated to the target rotation position when the switching of the power supply phases of the motor is performed by the open-loop control, and
   ending the open-loop control to stop the power supply to the motor upon determination that the motor has rotated to the target rotation position.

\* \* \* \* \*